No. 766,851.

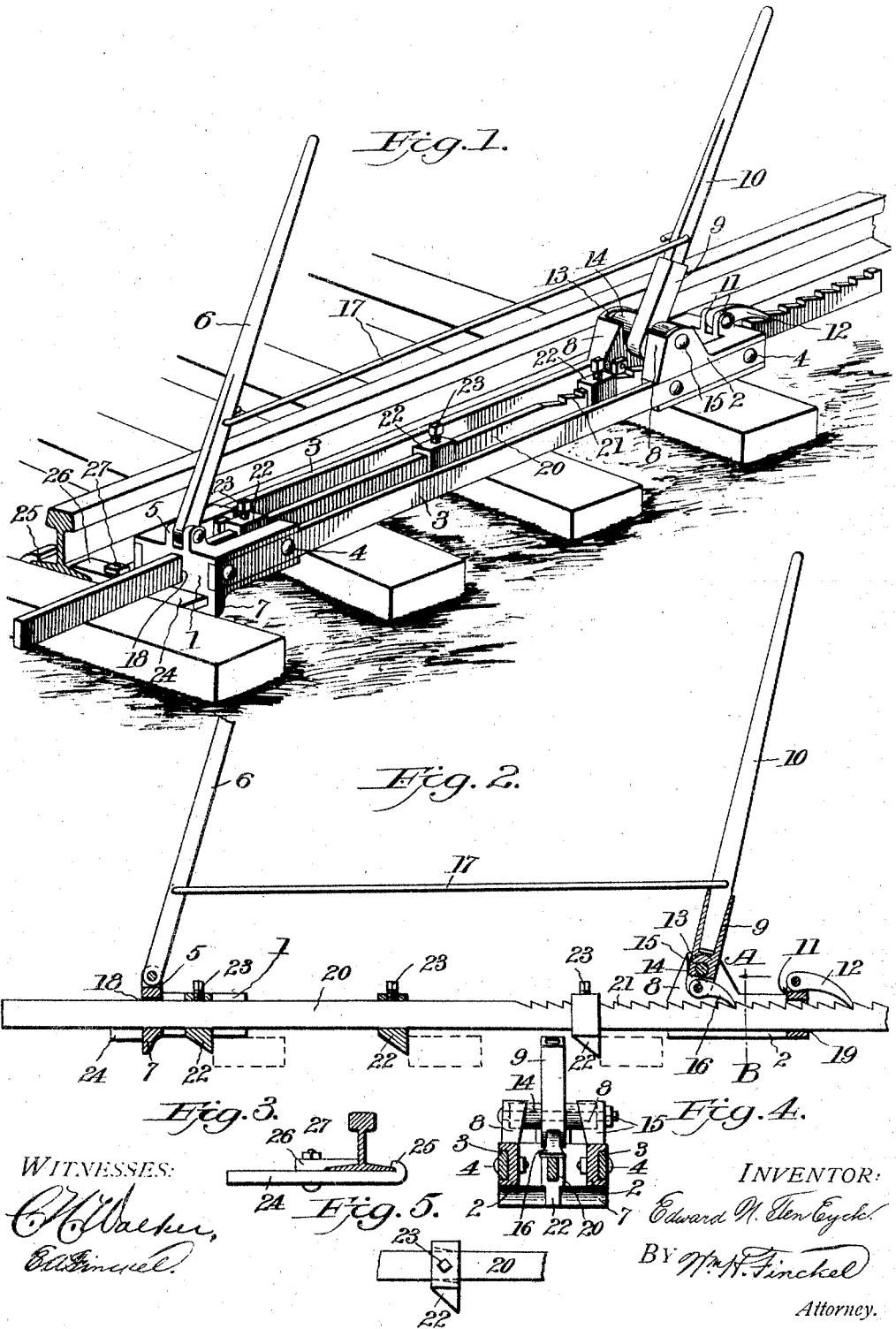

Patented August 9, 1904.

UNITED STATES PATENT OFFICE.

EDWARD N. TEN EYCK, OF SPRAKERS, NEW YORK, ASSIGNOR OF ONE-HALF TO JOHN G. LUDWIG, OF SPRAKERS, NEW YORK.

RAILWAY-TIE SPACER.

SPECIFICATION forming part of Letters Patent No. 766,851, dated August 9, 1904.

Application filed May 27, 1904. Serial No. 210,103. (No model.)

*To all whom it may concern:*

Be it known that I, EDWARD N. TEN EYCK, a citizen of the United States, residing at Sprakers, in the county of Montgomery and State of New York, have invented a certain new and useful Improvement in Railway-Tie Spacers, of which the following is a full, clear, and exact description.

The object of this invention is to provide an apparatus or jack for properly spacing or separating and alining a series of railway-ties whenever they have become displaced.

The invention consists in a "tie-spacer," so called, comprising a frame, a bar slidably mounted in said frame, a series of tie-engaging blocks mounted upon said bar, and means for forcibly moving said bar, all substantially as I will proceed now more particularly to set forth and finally claim.

In the accompanying drawings, illustrating the invention, in the several figures of which like parts are similarly designated, Figure 1 is a perspective view showing the application of the invention. Fig. 2 is a longitudinal section through the frame and tie-engaging blocks. Fig. 3 is an edge view of a stop for the tie-spacer. Fig. 4 is a transverse section on the line A B, Fig. 2, looking in the direction of the arrow; and Fig. 5 is a side elevation of portion of the bar and one of the tie-engaging blocks, showing another form of tie-engaging block.

The frame in its preferred form comprises the end pieces 1 and 2, preferably castings, connected by side pieces 3 of suitable length and fitted in channels in the end pieces and secured thereto in any suitable manner, as by rivets or bolts 4. The end piece 1 is provided upon its upper outer edge with ears 5 to receive an operating-lever 6 and is also provided with a downwardly-projecting abutment 7. The end piece 2 near its inner upper edge is provided with upwardly-projecting ears or bearings 8 to receive a socket-piece 9 for an operating-lever 10. The end piece 2 is also provided at its forward outer edge with ears 11 to receive a dog 12.

The ears or bearings 8 are provided on their inner opposing faces with recesses or notches 13 to receive the projecting lugs or pivots 14, integral with the socket-piece 9. The socket-piece 9 is secured in its bearings by means of a pin 15, passing through the ears or bearings 8 and the lugs 14 of the socket-piece. Of course the lever 10 or its socket-piece may be otherwise pivoted upon the end piece 2 or connected with the frame. A dog or pawl 16 is pivoted to the lower or under side of the socket-piece 9.

The levers 6 and 10 are connected by a rod 17, so as to work together.

The end pieces 1 and 2 are provided with openings 18 and 19 in their ends for the passage of a bar 20, provided upon its upper edge adjacent the end piece 2 with a series of ratchet-teeth 21 to be engaged by the pawl 16 and dog 12.

Mounted upon the bar 20 are a suitable number of tie-engaging blocks 22, and in the preferred construction these blocks are adjustably fitted upon said bar 20 and are held in their adjusted positions by means of set-screws 23 or other suitable fastenings.

As shown in Fig. 5, the openings in the tie-engaging blocks 22 may be slightly beveled or inclined with relation to the bar 20 (see dotted lines) in order to effect a binding action between the blocks and bar when pressure is applied to the blocks. In this form of block the set-screws for holding the blocks in their adjusted positions are applied in the sides of the block.

In connection with the spacer I employ an anchoring device, such as shown in Fig. 3, comprising a bar 24, having a hook 25 at one end to engage the base of the rail, and a clamping-piece 26, secured upon the bar by means of a bolt or other suitable fastening 27 and adapted to engage the opposite side of the base of the rail. The anchoring device is secured to the rail with its bar 24 extending outside the rails and in advance of the projecting ends of those ties which require spacing or adjusting, and the spacer is laid upon the projecting ends of the ties with its abutment 7 against the bar 24, and the tie-engaging blocks 22 having been adjusted upon the bar 20 to engage and properly space the ties the operators grasp the levers 6 and 10, and by pulling upon said levers the blocks 22 are brought against the ties with considerable pressure by means of the pawl 16 engaging the teeth 21 of the bar 20, and by successive pulls upon the levers the ties are forced to their proper position or at right angles to the rails, the bar 20 being prevented from moving backward during the reverse movement of the levers by means of the dog 12 engaging the teeth of said bar and the frame being anchored against backward movement by its engagement with the anchoring device. Thus it will be seen that a number of ties, three of them as here shown, may be spaced or adjusted simultaneously at one operation of the device.

With this device it is unnecessary to remove or dig out the ballast between the ties, as by means of the levers and the pawl-and-ratchet mechanism the bar and its attached tie-engaging blocks are moved and forced against the ties with considerable power. Hence considerable time and labor are saved by the use of this device as compared with the old practice in the spacing or adjusting of railway-ties.

I have herein shown the bar 20 as provided with three tie-engaging blocks; but it is obvious that any number of such blocks may be provided, the length of the bar and its frame being constructed in accordance with the number of blocks it is desired to use.

The rod 17 may be disconnected from the lever 10 and the lever 10 alone used to operate the device; but it is preferable that both levers be used, since by the use of two levers more power may be applied in manipulating the spacer. The levers also may be disconnected and folded upon the frame, and thus put in compact form for storing and transportation purposes.

I do not wish to be understood as limiting the invention to the exact details of construction herein shown and described, as the same may be altered in various particulars and still be within the scope of my invention.

What I claim is—

1. A railway-tie spacer, comprising a frame constructed of end pieces and connecting side pieces, a bar movably mounted in openings in the end pieces of said frame, a series of tie-engaging blocks secured to said bar whereby several ties may be simultaneously spaced, one of said end pieces serving as an abutment member for holding the spacer in operative position, and means for moving said bar.

2. A railway-tie spacer, comprising a frame constructed of end pieces and connecting side pieces, a bar movably mounted in openings in the end pieces of said frame, a series of tie-engaging blocks adjustably secured to said bar whereby said blocks may be properly adjusted for simultaneously spacing several ties, one of said end pieces serving as an abutment for holding the spacer in operative position, and means for moving said bar.

3. A railway-tie spacer, comprising a frame constructed of two end pieces and connecting side pieces, a ratchet-bar movably mounted in openings in the end pieces of said frame, a series of tie-engaging blocks secured to said bar whereby several ties may be simultaneously spaced, one of said end pieces serving as an abutment member for holding the spacer in operative position, a lever pivoted in the other end piece, and a pawl carried by the lever and adapted to engage the ratchet-bar to move it in said frame.

4. A railway-tie spacer, comprising a frame, a ratchet-bar movably mounted in said frame, tie-engaging blocks secured to said ratchet-bar, an abutment member on said frame to hold it in operative position, a lever pivoted to said frame, a pawl carried by the lever and adapted to engage the ratchet-bar to move it in the frame in one direction, and a dog pivoted to the frame and adapted to engage the ratchet-bar to hold it against movement in the opposite direction as the lever-pawl is moved to get a fresh hold on the ratchet-bar.

5. A railway-tie spacer, comprising a frame constructed of end pieces and connecting side pieces, a ratchet-bar movably mounted in openings in the end pieces, a series of tie-engaging blocks secured to said ratchet-bar, whereby several ties may be simultaneously spaced, one of said end pieces serving as an abutment member to hold the spacer in operative position, a lever pivotally supported in one of the end pieces and provided with a pawl adapted to engage and forcibly move the ratchet-bar in one direction, and an anchoring device adapted to be secured to a rail and to engage the abutment member to hold said frame in place.

6. A railway-tie spacer, comprising a frame, a ratchet-bar movably mounted in said frame, a lever pivotally supported at one end of the frame and provided with a pawl adapted to engage the ratchet-bar to move it in one direction, means for holding said frame against movement in the opposite direction, a second lever pivoted to the frame at the other end, and means for connecting and disconnecting said levers.

In testimony whereof I have hereunto set my hand this 25th day of May, A. D. 1904.

EDWARD N. TEN EYCK.

Witnesses:
WILLIAM D. HESS,
JOHN H. CRAVER.